Nov. 15, 1966  C. G. STARRANTINO  3,285,376
CLUTCH MECHANISM FOR USE IN AN AUTOMATIC CONTROL SYSTEM
Filed Jan. 28, 1965  7 Sheets-Sheet 1

INVENTOR.
CHARLES G. STARRANTINO
BY
Constantine A. Michalos
ATTORNEY

Fig 3

Nov. 15, 1966 C. G. STARRANTINO 3,285,376
CLUTCH MECHANISM FOR USE IN AN AUTOMATIC CONTROL SYSTEM
Filed Jan. 28, 1965 7 Sheets-Sheet 6

Fig 7

INVENTOR.
CHARLES G. STARRANTINO
BY
Constantine A. Michalos
ATTORNEY

Nov. 15, 1966   C. G. STARRANTINO   3,285,376
CLUTCH MECHANISM FOR USE IN AN AUTOMATIC CONTROL SYSTEM
Filed Jan. 28, 1965   7 Sheets-Sheet 7

Fig. 8

INVENTOR.
CHARLES G. STARRANTINO
BY
Constantine A. Michalos
ATTORNEY

United States Patent Office 3,285,376
Patented Nov. 15, 1966

3,285,376
CLUTCH MECHANISM FOR USE IN AN AUTOMATIC CONTROL SYSTEM
Charles G. Starrantino, Fair Lawn, N.J., assignor to The Bendix Corporation, Teterboro, N.J., a corporation of Delaware
Filed Jan. 28, 1965, Ser. No. 428,680
19 Claims. (Cl. 192—.02)

This invention relates to a novel clutch mechanism for use in an automatic control system and, more particularly, to a means for translating the mechanical output of a servo motor into an aircraft lever control movement, and to an impoved means whereby a plurality of aircraft control levers may be rotated by frictional forces resulting from an axial pressure being exerted on a plurality of friction surfaces.

An underlying premise in providing a means for translating servo motor output into aircraft control lever movement is to provide a versatility in application so that the same device may be used in different types of aircraft and under different circumstances. This versatility further extends to the consideration that for such a device to be of optimum utility, it should be adaptable as well to a single aircraft control lever as it is to a plurality of such levers.

The range of torque that such a device is able to transmit is of prime importance. The magnitude of this transmittable torque should be adjustable so that the mechanical output of the servo motor will be properly transmitted, but should not be so great as to preclude manual overriding by the aircraft pilot in cases of emergency.

Whenever an automatic control system is used, consideration must be given to the conditions that will result when such an automatic system is dis-engaged and then re-engaged. Automatic removal of any previously imposed manual friction, thus obviating the necessity of a manual manipulation by the pilot of the aircraft, is a desirable feature in such a system.

For optimum conditions of safety, it is paramount that the pilot be able to override an engaged automatic system particularly when it is necessary to manually override only several levers in a quadrant with the other levers remaining under the dominance of the automatic system. Also, it may be necessary under emergency conditions to have an automatic dis-engagement of the automatic system when the majority of control levers are manually overriden. Such an accommodation would eliminate the need for the pilot to manually activate the automatic system disengagement should an emergency arise.

For further reasons of safety and also for the protection of auxiliary components in the aircraft, maximum and minimum control positions, beyond which the servo motor will not drive, should be incorporated into the clutch mechanism.

It is an object of this invention to provide a clutch mechanism for translating the output torque of a servo motor into aircraft control lever movement with such movement being caused by the frictional force resulting from an axial pressure being exerted on a plurality of friction surfaces due to the magnetic action of a solenoid, and said clutch mechanism having the capability of being coupled directly to the servo motor or driven by it through a sprocket and chain arrangement or a pulley and belt arrangement.

Another object of this invention is to provide an improvement in such a clutch mechanism so that it can readily be converted to move any number of control elements.

Another object of this invention is to provide an improvement in such a clutch mechanism so that the torque level to be transmitted by the plurality of friction surfaces may be preset by adjusting the air gap between a solenoid and its armature, thus adjusting the axial pressure imposed upon the frictional surfaces.

Another object of this invention is to provide in combination with this improved clutch mechanism a means whereby pressure on the friction surfaces may be manually exerted, causing a level of friction to be inserted in the mechanism, whenever the solenoid actuating the automatic control system is de-energized, with this level of friction being automatically removed upon energization of the solenoid.

Another object of this invention is to provide an improvement in such a clutch mechanism whereby the friction level imposed on the mechanism may be preset to permit a manual overriding of several of a plurality of control levers coupled to an automatic system without effecting the position of the other levers.

Another object of this invention is to provide in combination with this improved clutch mechanism a control means whereby the servo motor is prevented from driving beyond a preset limit by maximum and minimum position cam operated limit switches, with the actuation of these switches causing power to be removed from the system.

Another object of this invention is to provide in combination with this improved clutch mechanism an optional means whereby power to the driving servo may be automatically removed whenever a predetermined number of levers in a control quadrant are manually moved or restrained, thus obviating the necessity of manually disengaging the automatic control system.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

*Basic mechanism*

Figure 1:
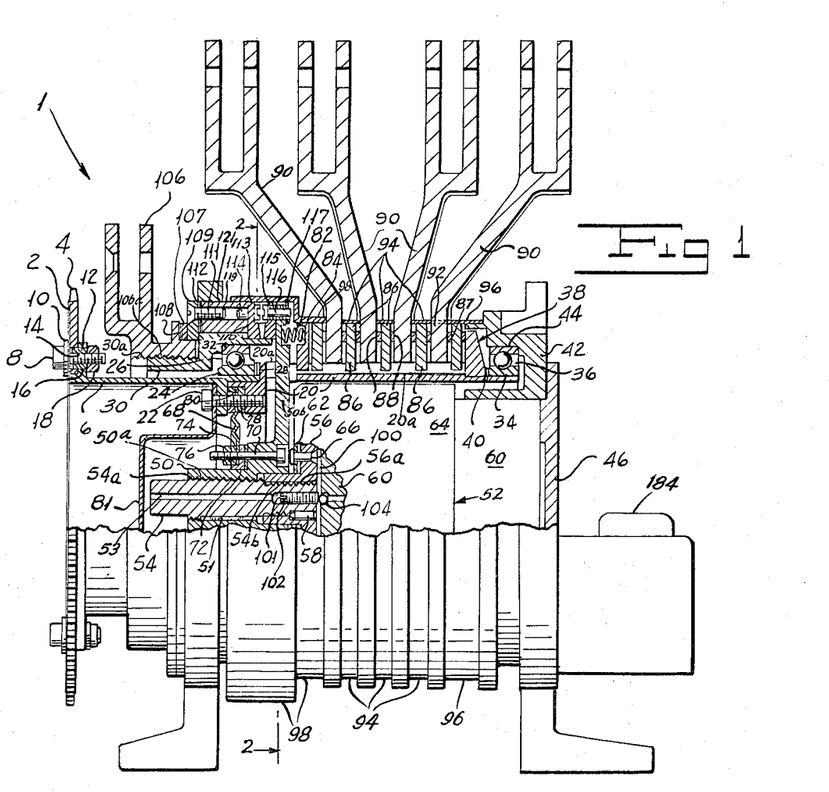
FIGURE 1 is a side view of a clutch mechanism embodying the invention with a sectional view of certain of the parts thereof taken along the lines 1—1 of FIGURE 3 and looking in the direction of the arrows.
Figure 8:
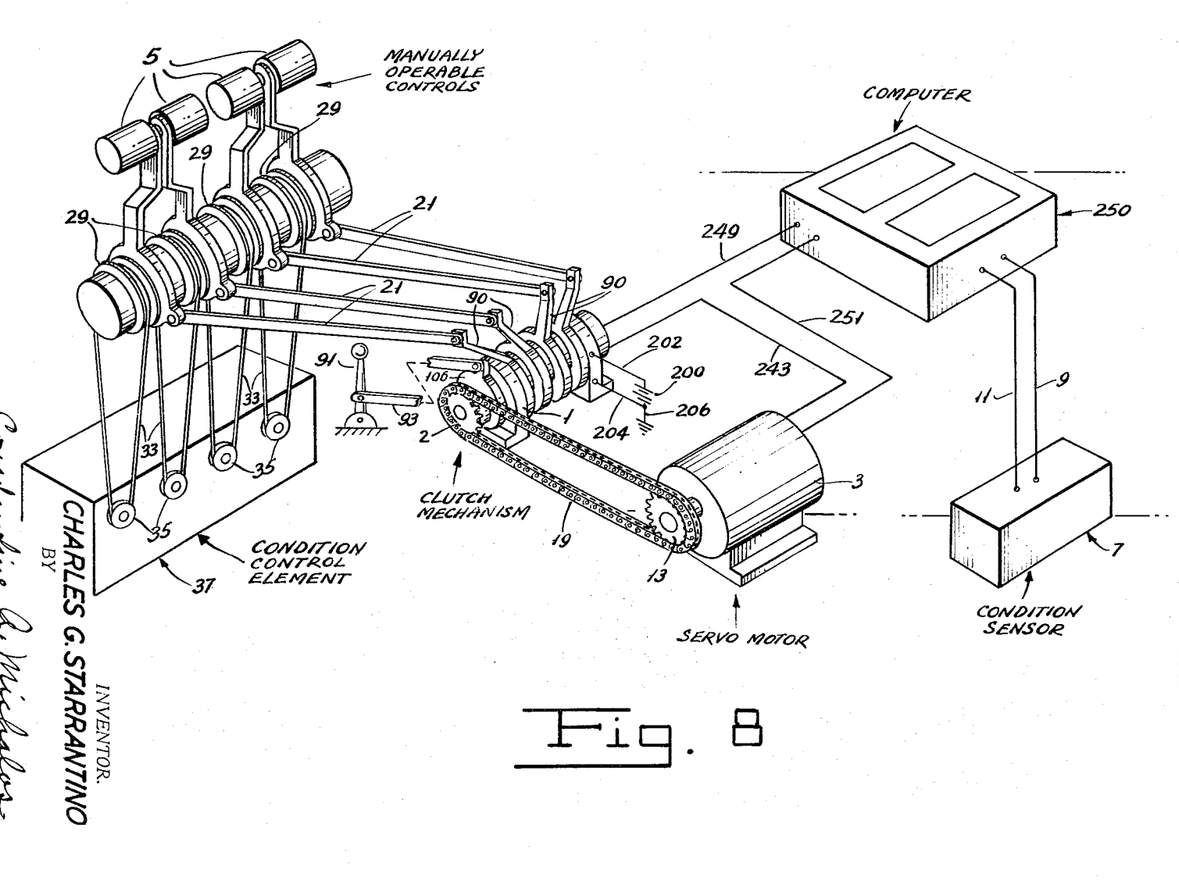

The clutch mechanism 1, shown generally in FIGURE 8 and in detail in FIGURE 1, includes a sprocket 2 having teeth 4 coupled to a hub 6 by screws 8 assembled to washers 10. The screws 8 are coupled through inserts 12 which align sprocket holes 14 with hub holes 16, the sprocket holes 14 and the hub holes 16 being equally spaced on corresponding diameters of the sprocket 2 and the hub 6 respectively, with the screws 8 being secured by self-locking nuts 18.

The sprocket 2, as shown in FIGURE 1, is driven by a chain 19 coupled to a sprocket 13 of a servo motor 3, shown generally in FIGURE 8. However, a pulley and belt arrangement could be used as well by removing the sprocket 2 and disassembling the screws 8, the washers 10, and the nuts 18 and substituting therefor a pulley suitably mounted to the hub 6. The output of the servo motor 3 may also be coupled directly to the clutch mechanism 1 by suitably adapting the output shaft of the servo motor 3 in FIGURE 8 to the hub 6 in FIGURE 1.

Figure 3:
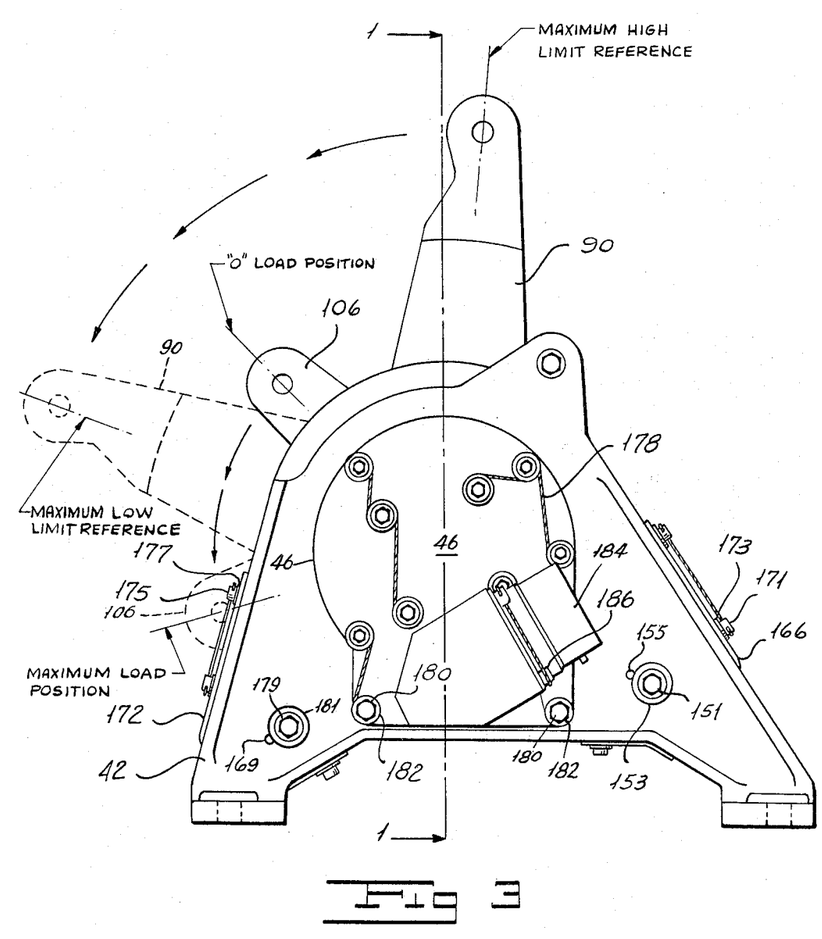
FIGURE 3 is an end view of the clutch mechanism taken from the right hand end of FIGURE 1.

In reference to FIGURE 1, motion is transmitted from the sprocket 2 to an input shaft 20 by coupling the hub 6, with the sprocket 2 mounted thereon in the aforenoted manner, to the input shaft 20 through bolts 22, with the hub 6 having a bearing portion on which is rotatably mounted an inner race 24 of an annular ball bearing 26. The annular ball bearing 26 is axially positioned in relation to a mounting frame 30 by shims 28. The mounting frame 30 and the hub 6 are arranged so that the mounting frame 30 fits over the hub 6 with the mounting frame 30 engaging an outer race 32 of the annular ball bearing 26, thus permitting rotational motion of the hub 6 and the input shaft 20 relative to the mounting frame 30. The input shaft 20 extends axially, engaging an inner race 34 of an annular ball bearing 36. The annular ball bearing 36 is laterally positioned in relation to a back up plate 38 by shims 40. A mounting frame 42 engages an outer race 44 of the annular ball bearing 36, thus permitting rotational motion of the input shaft 20 relative to the mounting frame 42. A rear cover 46 is affixed to the mounting frame 42, as shown in FIGURES 1 and 3.

A pressure plate 50 is made to rotate with the input shaft 20 by arms 50b of the pressure plate 50 engaging in slots 20a of the input shaft 20. This relationship is further shown in FIGURE 2 in which the arms 50b of the pressure plate 50 engage in the slots 20a of the input shaft 20 thereby imposing any rotational motion of the shaft 20 upon the pressure plate 50.

In reference to FIGURE 1, the pressure plate 50 is shown coupled to a shielded solenoid 52 by a threaded inside diameter 50a of the pressure plate 50 engaging with a threaded outside diameter 54a of a solenoid armature shaft 54. The shaft 54 has a longitudinal channel 53 extending therethrough, and having a function as hereinafter explained. Angular motion of the rotating pressure plate 50 relative to the solenoid armature shaft 54 is normally resisted by a suitably resilient insert 51, with the insert 51 being of a polyamide material such as nylon or another suitable material. The solenoid armature shaft 54 is thus normally held by the insert 51 so as to rotate with the pressure plate 50.

The solenoid armature shaft 54 is coupled to a solenoid armature 56 by engaging a threaded inside diameter 56a of the solenoid armature 56 with a threaded outside diameter 54b of the solenoid armature shaft 54. Rotational motion of the solenoid armature shaft 54 and the solenoid armature 56, one relative to the other, is prevented by a pin 58 radially locking the solenoid armature shaft 54 to the solenoid armature 56. The threaded assembly of the solenoid armature shaft 54 and the solenoid armature 56 is particularly advantageous inasmuch as it permits easy replacement of either of the parts in case of wear or breakage. The importance of such a facility is evident when it is considered that in order to provide the optimum magnetic field within the solenoid 52, the solenoid armature shaft 54, and the solenoid armature 56 will be fabricated out of a soft iron material, with such a material being particularly susceptible to wear and breakage.

The solenoid 52, having a core 60, is of the shielded type, with a shield 62 having a cylindrical shell 64 constructed of a nickel iron or other suitable material, and with the shield 62 and the shell 64 coupled by rivets 66 to the armature 56. The shield 62 with its shell 64 is so arranged as to increase the intensity of the magnetic flux within the solenoid 52.

A diaphragm 68 is coupled to the pressure plate 50 and the solenoid armature shaft 54 which is in threaded engagement with the pressure plate 50, and to the input shaft 20, while the hub 6 is coupled to the shaft 20 through the bolts 22. The diaphragm 68 is coupled to the pressure plate 50 through screws 70, inner diaphragm clamps 72, outer diaphragm clamps 74 and self-locking nuts 76. The diaphragm 68 is further coupled to the hub 6 and the input shaft 20 through the bolts 22, an inner diaphragm ring 78, and an outer diaphragm ring 80.

A magnetic shield 81, fabricated of a nickel iron or other suitable shielding material, has the purpose of shielding the other components of the mechanism from the magnetic field of the solenoid 52. The shield 81 is coupled to the hub 6 and the input shaft 20 through the bolts 22.

Figure 2:
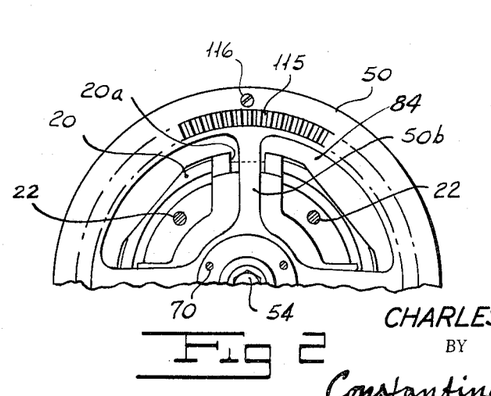
FIGURE 2 is a fragmentary end view taken along the line 2—2 of FIGURE 1 and looking in the direction of the arrows.

The radial arrangement of the bolts 22 and the screws 70 in relation to the input shaft 20 and the solenoid armature shaft 54 is shown in FIGURE 2.

When the solenoid 52 is energized as hereinafter more fullly described, the magnetic field so produced imparts an axial motion to the threaded and pinned assembly of the solenoid armature shaft 54 and the solenoid armature 56 in the direction of the solenoid core 60 as viewed in FIGURE 1. This motion is transmitted through the pressure plate 50 and arms 50b to helical springs 82 positioned between the pressure plate 50 and a clutch disc 84. The resiliency of the diaphragm 68 coupled to the pressure plate 50, the hub 6 and the input shaft 20, must be sufficient so as not to impede the axial motion so transmitted to the helical springs 82.

The axial motion so transmitted causes a compression of the helical springs 82, with this compression causing an axial pressure to be transmitted through the clutch disc 84 to a plurality of friction discs 86, as shown in FIGURE 1. The friction discs 86 have bonded on both sides thereof elements 87 of a sintered copper alloy material, or other material suitable to provide friction surfaces 88. The clutch disc 84 and the friction discs 86 are mounted to the shaft 20 so as to rotate with the shaft 20, but may be axially displaceable relative thereto.

As motion is transmitted from the driving servo 3, in FIGURE 8, to the input shaft 20 through the sprocket 2 coupled by the hub 6 to the input shaft 20, with the input shaft 20 engaged on the inner races 24 and 34 of the annular ball bearings 26 and 36, the friction discs 86, mounted to the input shaft 20, as heretofore noted, will rotate with the input shaft 20. The friction discs 86 are arranged at opposite sides of control levers 90 so that as an axial pressure is transmitted to the friction discs 86, the friction elements 87 bonded to the friction discs 86 will cause a friction force to be exerted on both sides of the control levers 90, said control levers 90 being freely arranged on the input shaft 20. The friction force exerted on the control levers 90 will cause the control levers to transmit a torque which may be coupled through a conventional linkage means 21 to pilot operated aircraft controls 5, shown in FIGURE 8. The number of the control levers 90 so effected may be reduced by removing any lever 90 and substituting a spacer, having the width of a lever 90 such as shown at 92, in its place. The mechanism, shown in FIGURE 1, and described herein includes four control levers 90 for purposes of illustration.

Seals 94, a seal 96 and a seal 98 of a suitable resilient plastic material are provided to protect the components of the clutch assembly including friction surfaces 88, clutch disc 84 and helical springs 82 from contamination by the outside atmosphere.

Since the control levers 90 are free to rotate independent of each other and independent of the friction discs 86 at opposite sides of the levers 90, any of the levers 90 may be repositioned without effecting the position of the other of said levers. For this reason, up to three levers 90 in a four lever system may be re-positioned by applying an overriding torque without affecting the position of the other of said levers.

Pre-setting of torque to be transmitted

The desirability of being able to pre-set the torque value to be transmitted by the control levers 90 may be accomplished by adjusting an air gap 100 between the solenoid armature 56 and the solenoid core 60, as shown in FIGURE 1.

The torque to be transmitted by the control levers 90 is a function of the axial force imposed upon the friction surfaces 88 formed by the copper alloy elements 87 bonded to the clutch discs 86. This axial force is transmitted through the solenoid armature 56, the pressure plate 50, the helical springs 82 and the clutch plate 84. The magnitude of this axial force will depend on the air gap 100 between the solenoid armature 56 and the solenoid core 60. The smaller the air gap 100, the greater will be the density of the magnetic flux and hence the greater the axial force. This may be shown by the following formula:

$$F = \frac{B^2}{8\pi}$$

where:

$B$=Flux density per unit area
$F$=Force per unit area

Electrical Circuits and Machinery, Hehre and Harness, John Wiley and Sons, vol. 1, page 66, sixth printing, February 1947.

In the present invention, the air gap 100 is externally adjustable by rotating the solenoid armature shaft 54 which has the outside diameter 54a in threaded engagement with the inside diameter 50a of the pressure plate 50. The solenoid armature shaft 54 may be turned against the resistance of the insert 51 formed of a suitably resilient polyamide material such as nylon, or another suitable material, which normally acts to resist relative rotational motion between the pressure plate 50 and the solenoid armature shaft 54 and which resistance may be overcome by an appropriate torque being exerted on the armature shaft 54. As hereinafter mentioned, the solenoid armature 56 is arranged in threaded engagement with the solenoid armature shaft 54 and is suitably pinned thereto by the pin 58 so that the angular movement of the solenoid armature shaft 54 relative to the pressure plate 50 will cause, through the threaded engagement of the screw threads 50a and 54a, an appropriate axial adjustment of the solenoid armature 56 relative to the armature core 60, thus providing an adjustment in the air gap 100. Once the air gap 100 has been so adjusted, it may be fixed by tightening a set screw 102 in screw threaded engagement in the channel 53 of the armature shaft 54 against a ball 104 carried by the armature 60. The set screw 102 may be so appropriately adjusted by the insertion of a suitable tool in the longitudinal channel 53 of the armature shaft 54 so as to engage in a slot 101 in the head of the set screw 102 to effect the adjustment thereof, thus providing a positive stop to terminate the movement of the solenoid armature 56 toward the solenoid core 60 each time the solenoid 52 is energized.

When the air gap 100 is at a minimum, therefore, maximum torque will be transmitted by the control levers 90. Clutch friction may be so adjusted to allow a clutch mechanism to drive the aircraft controls 5 in FIGURE 8 without slippage during normal operation, but to allow easy manual overriding of the system in case of an emergency.

Friction lock

It is advantageous in a clutch mechanism such as the one described in the present invention to provide for the manual insertion of a predetermined level of friction into the mechanism whenever the solenoid 52 is de-energized, and to provide for the automatic removal of such friction upon re-energization of the solenoid 52.

In reference to FIGURE 1, a friction lock lever 106 with an internally threaded diameter 106a is in screw threaded engagement with an externally threaded diameter 30a of the mounting frame 30. The friction lock lever 106 may be angularly positioned by a hand lever 91 connected to the friction lock lever 106 by a connecting rod 93, as shown in FIGURE 8. When such an angular positioning occurs to cause a movement of the friction lock lever 106 in a clockwise direction, as viewed from the left side of FIGURE 8, the friction lock lever 106, in screw threaded engagement with the stationary mounting frame 30, will be adjusted axially to the right toward the pressure plate 50, as viewed in FIGURE 1. Such axial movement will effect an axial adjustment of the pressure plate 50 coupled to the solenoid armature 56 through the armature shaft 54 in a manner as heretofore noted. This adjustment of the pressure plate 50 will cause an axial pressure on the springs 82 which are retained by the pressure plate 50 and the clutch disc 84. This pressure is applied to the springs 82 through shims 108, a spacer 107, a spacer 109 and shims 112, secured to a clutch plate 110 by screws 111, a face gear 113 engaging a face gear 115 and the pressure plate 50.

Figure 4:
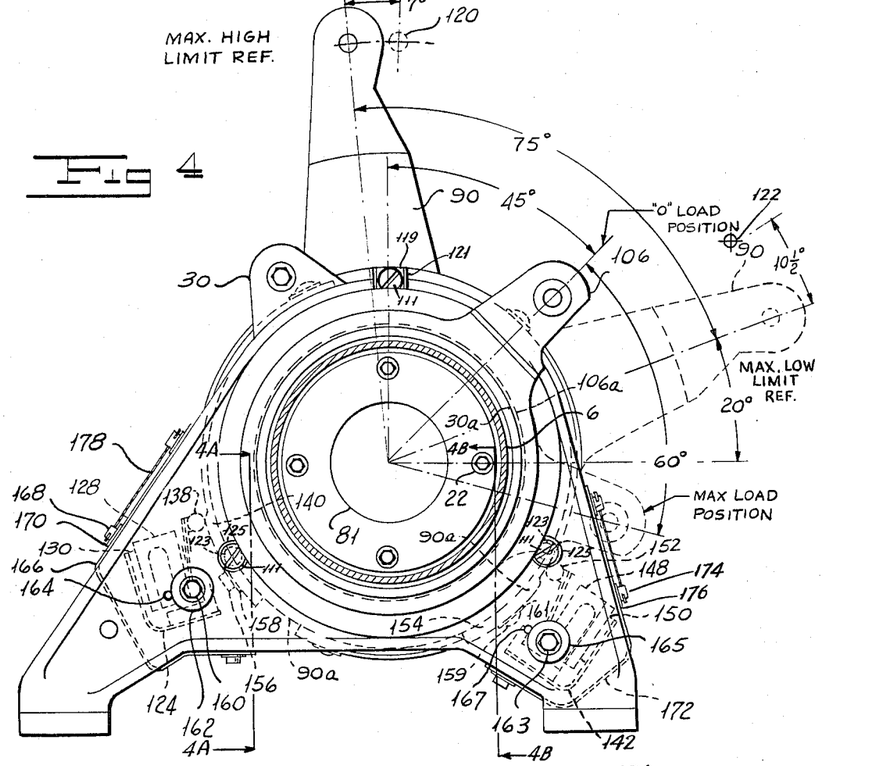
FIGURE 4 is a view of the other end of the clutch mechanism taken from the left hand of FIGURE 1 with parts removed to show detail.

The clutch plate 110 fits freely over the mounting frame 30 and is arranged relative thereto so as to be axially displaceable relative to the mounting frame 30 by the axial adjustment of the friction lock lever 106, with said adjustment transmitted to the clutch plate 110 through the shims 108, the spacer 107, the spacer 109 and the shims 112. The arrangement of the mounting frame 30 and the clutch plate 110 is best shown in FIGURE 4. As seen in FIGURE 4, an arm 119 of the clutch plate 110 is engaged in a slot 121 of the mounting frame 30, and internally threaded aligning pins 123 of the clutch plate 110 fit into the holes 125 of the mounting frame 30. The holes 125 of the mounting frame 30 provide clearance so that the screws 111 may be arranged in threaded engagement with the internally threaded aligning pins 123 of the clutch plate 110 in order to secure the spacer 109 and the shims 112 to the clutch plate 110. Another screw 111 is in threaded engagement within a threaded hole provided in the arm 119 of the clutch plate 110 to further secure the spacer 109 and the shims 112 to the clutch plate 110, as shown in FIGURE 1.

The face gear 113 is nonrotatably secured to the clutch plate 110 by screws 114. The face gear 113 is cooperatively arranged with the face gear 115. The face gear 115 is secured to the pressure plate 50 by screws 116 inserted through screw inserts 117 to thereby be rotatably with the pressure plate 50. The arrangement between the face gear 113 and the face gear 115 is such that when the clutch plate 110, with the face gear 113 secured thereto, is adjusted axially due to the axial adjustment of the friction lock lever 106, a point will be reached where the face gear 113 will be in meshing engagement with the face gear 115. Due to such engagement, rotation of the face gear 115 will be prevented, and the mechanism will become locked. The radial relation between the screws 116, the face gear 115 and the pressure plate 50 is shown in FIGURE 2.

The compression of the helical springs 82 in the aforenoted manner will cause a friction force to be exerted on the control levers 90 through the clutch disc 84, the friction discs 86, the copper alloy elements 87, and the friction surfaces 88. This friction force is a function of the angular movement of the friction lock lever 106 and the resulting axial adjustment thereof. The friction force so imposed on the control levers 90 will be locked into the system due to the meshing engagement of the face gear 113 and the face gear 115, as heretofore noted.

When the solenoid 52 is re-energized, the pressure plate 50 with the face gear 115 coupled thereto by the screws 116 and the inserts 117 will move laterally to the right, as viewed in FIGURE 1 by the motion of the solenoid armature 56 coupled to the pressure plate 50 through the armature shaft 54, with said motion being toward the armature core 60, as viewed in FIGURE 1. This lateral movement of the pressure plate 50 will cause the rotatable face gear 115 to be disengaged from the nonrotatable face gear 113. The system is thus unlocked and a level of friction is automatically imposed upon the system as determined by the adjustment of the air gap 100 in a manner as heretofore noted. When the solenoid 52 is again de-energized, the helical springs 82 will extend and return the pressure plate 50 to a position as provided for by the axial adjustment of the friction lock lever 106, thus causing the rotatable face gear 115 to re-engage with the nonrotatable face gear 113. The friction imposed by the lateral adjustment of the friction lock lever 106 will thus be relocked into the system. In this manner, the need for the manual return of the friction lock lever 106 to the zero friction position upon energizing the solenoid 52 is obviated.

Maximum and minimum control positions

A feature embodied in the present invention is the incorporation of maximum and minimum cam actuated control lever position limit switches which will stop the servo motor 3 shown in FIGURE 8 from driving beyond preset limits.

Figure 4A:
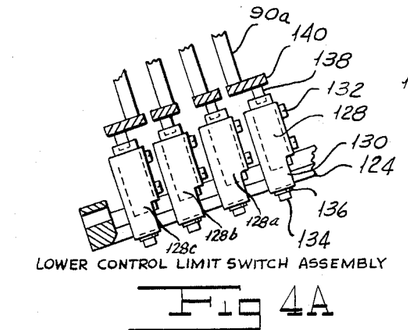
FIGURE 4A is a fragmentary side view taken along lines 4A—4A of FIGURE 4 looking in the direction of the arrows and showing a sectional view of certain of the parts thereof.
Figure 4B:
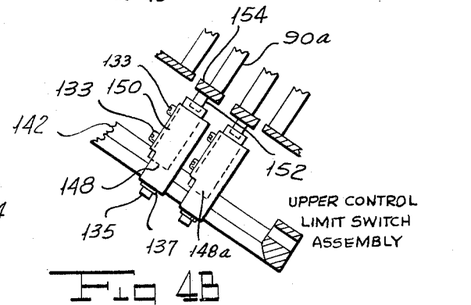
FIGURE 4B is a fragmentary side view taken along lines 4B—4B of FIGURE 4 looking in the direction of the arrows and showing a sectional view of certain of the parts thereof.
Figures 5, 5A, 5B:
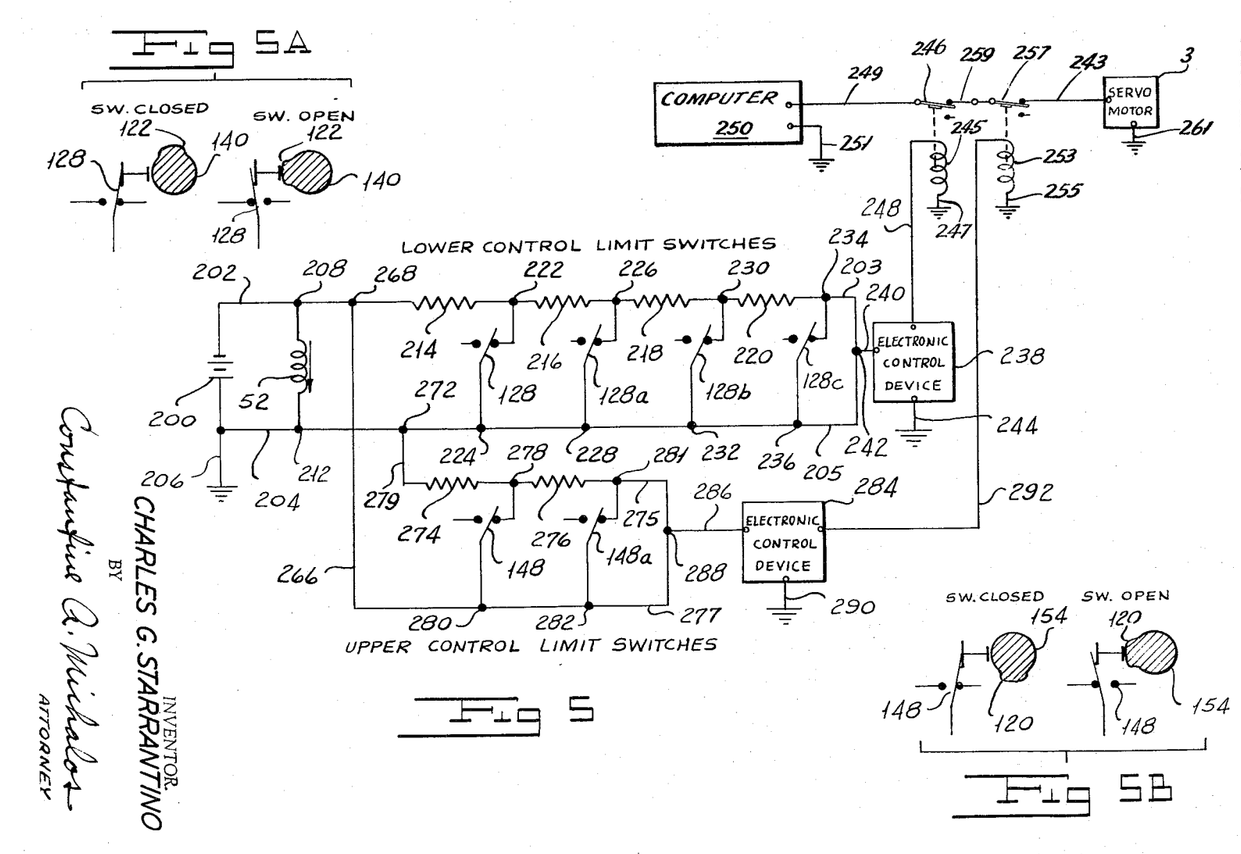
FIGURE 5 is a schematic wiring diagram of the electrical control system embodied in the present invention.
FIGURE 5A is a diagrammatic view illustrating the lower control limit switch operation of the system of FIGURE 5.
FIGURE 5B is a diagrammatic view illustrating the upper control limit switch operation of the system of FIGURE 5.

In order to accomplish this objective, the present invention includes four lower control lever position limit switches 128, each activated by a control cam 140, as shown in FIGURES 4, 4A, and 5A, and normally being biased by a spring means to a closed switch position, as shown by FIGURE 5. As hereinafter explained, the opening of any two of the lower control limit switches 128 will cause a voltage signal to be applied to an electronic control device 238, and the control device 238 as shown in FIGURE 5 will cause a relay switch 246 to disconnect power to the servo motor 3. Similarly, two upper control lever position limit switches 148 are provided, each activated by a control cam 154, as shown in FIGURES 4, 4B, and 5B, and normally being biased by a spring means to a closed switch position, as shown in FIGURE 5. The opening of the two upper control lever position limit switches 148 will cause a voltage signal to be applied to an electronic control device 248, and the control device 248 will cause a relay switch 257 to disconnect power to the servo motor 3, as hereinafter explained.

The physical arrangement of these limit switches is shown in FIGURES 4, 4A, and 4B, and the circuitry pertinent thereto is shown in FIGURES 5, 5A and 5B.

In reference to FIGURE 4, the magnetic shield 81 is shown secured to the hub 6 by bolts 22, while the mounting frame 30 is shown with its externally threaded diameter 30a in threaded engagement with the internally threaded diameter 106a of the friction lock lever 106. The control lever 90 is shown at the miximum high limit position which is seven degrees away from a high limit "off" point 120. The maximum low limit reference position of the control lever 90 is shown in dotted lines 75 degrees from the maximum high limit reference position and 20 degrees from a horizontal position which is ten and one half degrees from a low limit "off" point 122. The servo motor 3 in FIGURE 8 is set to receive power in positions of the control levers 90 between the limits defined by the points 120 and 122, with the power being removed when the control levers 90 are driven beyond these points. Similarly, the "zero" load position of the friction lock lever 106 is shown in solid lines in FIGURE 4, in which position there is exerted no axial force on the mechanism. This "zero" load position is shown in FIGURE 4 as 60 degrees away from a dotted line maximum load position of the friction lock lever 106 in which position there is exerted a maximum axial force on the mechanism.

In reference to FIGURE 4A, the lower control limit switch assembly is shown including a switch holding bracket 124, four switches 128, 128a, 128b, and 128c, which may be of the miniature single pole type, secured to switch brackets 130 by screws 132. The switch brackets 130 are, in turn, affixed to the switch holding bracket 124 by screws 134 and washers 136. Switch actuators 138 are in an operative contacting relation with the control cams 140 mounted on control lever barrels 90a. Similarly, the upper control lever position limit switch assembly is shown in FIGURE 4B and includes a switch holding bracket 142, two switches 148 and 148a which may be of the miniature single pole type, secured to switch brackets 150 by screws 133. The switch brackets 150 are, in turn, affixed to the switch holding bracket 142 by screws 135 and washers 137. Switch actuators 152 are in an operative contacting relation with control cams 154, the cams 154 mounted on the control lever barrels 90a.

In reference to FIGURE 4, the position of the switch holding bracket 124 having switch brackets 130 and switches 128, 128a, 128b, and 128c affixed thereto, of which the switch 128 may be seen in dotted lines in FIGURE 4, may be so adjustably positioned that the switch actuators 138, in contact with cams 140 secured to lever barrels 90a by screws 156 and washers 158, cause the switches 128, 128a, 128b, and 128c to open when therespective control levers 90 are at the low limit point 122. With the lower control limit so established, the switch holding bracket 124 is secured to the mounting frame 30 by bolts 160 and washers 162. To insure this switch adjustment, and to secure the switch holding bracket 124 in the desired position, the switch holding bracket 124 is doweled to the mounting frame 30 with dowel pin 164, as shown in FIGURE 4.

In a similar manner, the switch holding bracket 142 having switch brackets 150 with switches 148 and 148a mounted thereto, of which the switch 148 may be seen in dotted lines in FIGURE 4, may be so adjustably positioned that switch actuators 152, in contact with cams 154 secured to lever barrels 90a by screws 159 and washers 161 cause the switches 148 and 148a to open when the control levers 90 are at the high limit point 120. When the desired adjustment has been achieved, the switch holding bracket 142 is secured to the mounting frame 30 by bolts 163 and washers 165 and pinned in position with the dowel pin 167, as shown in FIGURE 4.

The upper and lower limits defined herein and shown in FIGURE 4 are typical and are shown for illustration only. These limits may vary depending on the application of the present invention.

Also shown in FIGURE 4 is a dust cover 166 secured to the mounting frame 30 by screws 168 and washers 170 and a dust cover 172 secured to the mounting frame 30 by screws 174 and washers 176. The purpose of the dust covers 166 and 172 is to protect the lower control limit switch assembly shown in FIGURE 4A and the upper control limit switch assembly shown in FIGURE 4B from foreign material that might hinder the operation thereof. All external mounting screws such as the screws 168 and 174 should be secured to prevent loosening. This may be accomplished by a tie wire means such as that designated by the numeral 178 or another equivalent means.

In reference to FIGURE 3, the mounting frame 42 of FIGURE 1 is shown with the cover 46 affixed thereto by bolts 180 and washers 182. An electrical receptacle 184 is affixed to the cover 46 by screws 186. Dust cover 172 is affixed to the mounting frame 42 of FIGURE 3 by screws 175 and washers 177 and dust cover 166 is affixed to the mounting frame 42 of FIGURE 3 by screws 171 and the washer 173, with all external mounting screws being secured by a suitable tie wire means 178 or an equivalent means.

The control lever 90 is shown by FIGURE 3 in a solid line maximum high limit reference position and in a dash line maximum low limit reference position, while the friction lock lever 106 is shown at a solid line "zero" load position and at a dash line maximum load position. The aforenoted positions are also shown in FIGURE 4 and heretofore set forth in the description thereof.

The switch holding bracket 142, shown in FIGURE 4B, is secured to the mounting frame 42, as shown in FIGURE 3, by bolts 179 and washers 181 and doweled in position by pin 169. The switch holding bracket 124, shown in FIGURE 4A, is secured to the mounting frame 42 by bolts 151 and washers 153 and doweled in position by a pin 155, as shown in FIGURE 3.

In reference to FIGURE 5, power is supplied by a suitable direct current supply 200 having output line conductors 202 and 204 with the line conductor 204 being grounded through a line conductor 206. The solenoid 52 having the purpose of imposing an axial force on the mechanism, as shown in FIGURE 1, is joined to the line conductors 202 and 204 at junctions 208 and 212. The lower control limit switches 128, 128a, 128b, and 128c are joined through resistors 214, 216, 218, and 220 respectively to the line conductors 202 and 204 at junctions 222 and 224, junctions 226 and 228, junctions 230 and 232, and junctions 234 and 236, respectively.

The switches 128, 128a, 128b, and 128c are normally spring biased to a closed circuit position shown in FIGURE 5. As the control lever arm 90, shown in FIGURE 4, reaches the lower control limit point 122, the point 122 being established as shown in FIGURE 4 and heretofore described, the cam 140 will cause the switch 128 to open, as schematically shown in FIGURE 5A.

In reference to FIGURE 5, the system is set so that when any two of the switches 128, 128a, 128b, and 128c are thus opened, a voltage signal will be transmitted to the electronic control device 238 through a line conductor 240 joining line conductors 203 and 205 at a junction 242 and a ground line conductor 244. It should be noted that the opening of the system by the operation of two of the switches 128, 128a, 128b, and 128c is a predetermined factor and the number of switches needed to open the system can be set depending on the number of control members 90 utilized in the system. The electronic control device 238 may be of a conventional type arranged to effect energization of a relay winding 245 grounded by a line conductor 247 in response to said voltage signal so as to cause the relay switch 246, normally biased by a suitable spring means to a closed switch position, to open, thus opening a circuit controlling energization of the servo motor 3. The electronic control device 238 has an output line conductor 248 and the grounded output line conductor 244 connected across the relay winding 245 to effect such energization thereof. Opening of the relay switch 246 will interrupt the control of the servo motor 3, grounded by a line conductor 261, by a computer 250 which may be of a conventional type and coupled to the relay switch 246 by an output line conductor 249 and a grounded output line conductor 251.

In reference to FIGURE 4, when any two of the control levers 90, in a system of four levers, reach their respective lower control limits 122, power will be removed from the servo motor 3 as shown in FIGURE 5 and FIGURE 5A, the power being restored upon operation of the system within its lower control limit.

In reference to FIGURE 5, power from the input supply 200 is coupled to the upper control limit switches 148 and 148a by a line conductor 266 joining the line conductor 202 at a junction 268 and a line conductor 279 joining the line conductor 204 at a junction 272. The upper control limit switches 148 and 148a are joined through resistors 274 and 276 respectively to the input line conductors 266 and 279 at junctions 278 and 280 and junctions 281 and 282 respectively.

The switches 148 and 148a are normally spring biased to a closed switch position, as shown by FIGURE 5. As the control lever arm 90 shown in FIGURE 4 reaches the upper control limit point 120, the point 120 being established as shown in FIGURE 4 and heretofore explained, the cam 154 will cause the switch 148 to open as schematically shown in FIGURE 5B.

In reference to FIGURE 5, when the two switches 148 and 148a are thus opened, a voltage signal will be transmitted to the electronic control device 284 through line conductors 275 and 277 joining a line conductor 286 at a junction 288. The electronic device 284 may be of a conventional type arranged to effect energization of a relay winding 253 grounded by a line conductor 255 in response to said voltage signal so as to cause the relay switch 257, normally biased by a suitable spring means to a closed switch position, to open, thus opening a circuit controlling energization of the servo motor 3. The electronic control device 284 has an output line conductor 292 and a grounded output line conductor 290 connected across the relay winding 253 to effect such energization thereof. Opening of the relay switch 257 will interrupt the control of the servo motor 3 by the computer 250 coupled to the switch 257 through the output line conductors 249 and 251, the switch 246, a line conductor 259 and a line conductor 243.

*Automatic lever disconnect*

An optional feature applied in combination with the present invention is an automatic lever disconnect. The lever disconnect device is a subject of U.S. Patent No. 3,043,539 by Alfred F. Bishop, filed January 8, 1960, and assigned to The Bendix Corporation, the same assignee as the present application. This device will automatically remove electrical power from the driving servo motor 3 in FIGURE 8 whenever the force exerted to manually override the control levers 90 exceeds a predetermined level.

Figure 6:
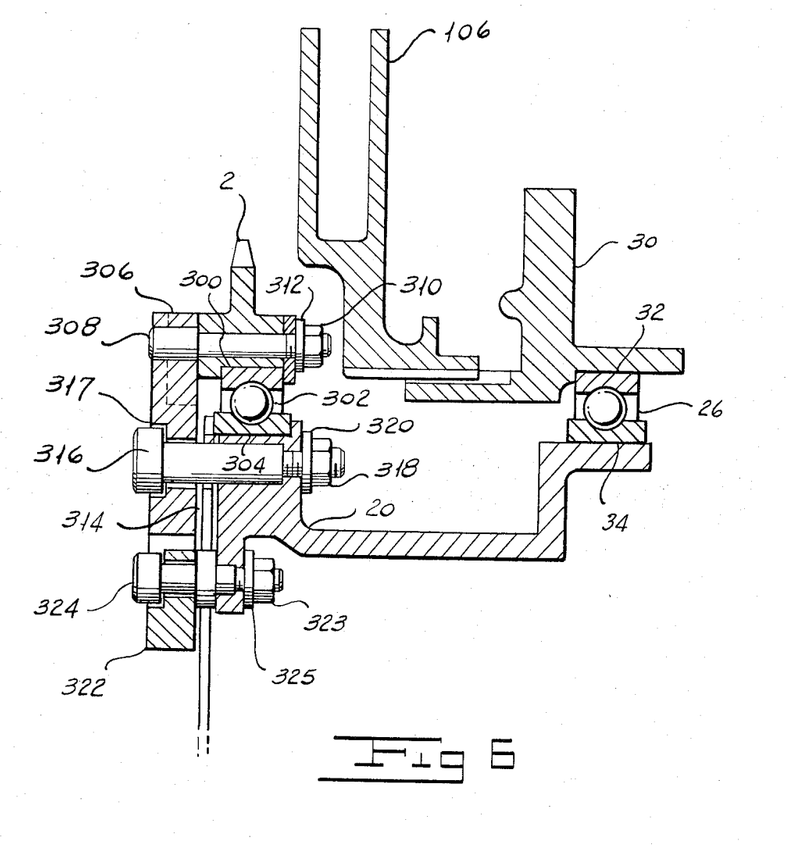
FIGURE 6 is a side sectional view taken along the lines 6—6 of FIGURE 7 showing a modified form of the automatic lever disconnect device.

In reference to FIGURE 6, whenever the automatic lever disconnect is used, the sprocket 2 is mounted on an outer race 300 of an annular ball bearing 302 instead of being mounted directly to the input shaft 20, as shown in FIGURE 1. The input shaft 20 is mounted to an inner race 304 of the annular ball bearing 302 and, as shown in FIGURES 1 and 6, to the inner race 24 of the annular ball bearing 26. The friction lock lever 106 is in threaded engagement with the mounting frame 30, and the mounting frame 30 is mounted to the outer race 32 of the annular ball bearing 26. The remaining clutch mechanism is as shown in FIGURES 1, 2, 3, and 4. With the arrangement as shown in FIGURE 6, therefore, the sprocket 2 and the input shaft 20 will rotate relative to each other.

A lever 306 is pivotally connected to the sprocket 2 through a pin 308 secured by a nut 310 and a washer 312. The lever 306 is further connected to the input shaft 20 through a mounting plate 314 and a pin 316 which floats in an oversize hole 317, the pin being secured by a nut 318 and a washer 320.

There is further arranged in cooperative relation to the lever 306 a lever 322 pivotally connected to the input shaft 20 through a pin 324 secured by a nut 323 and a washer 325.

Figure 7:
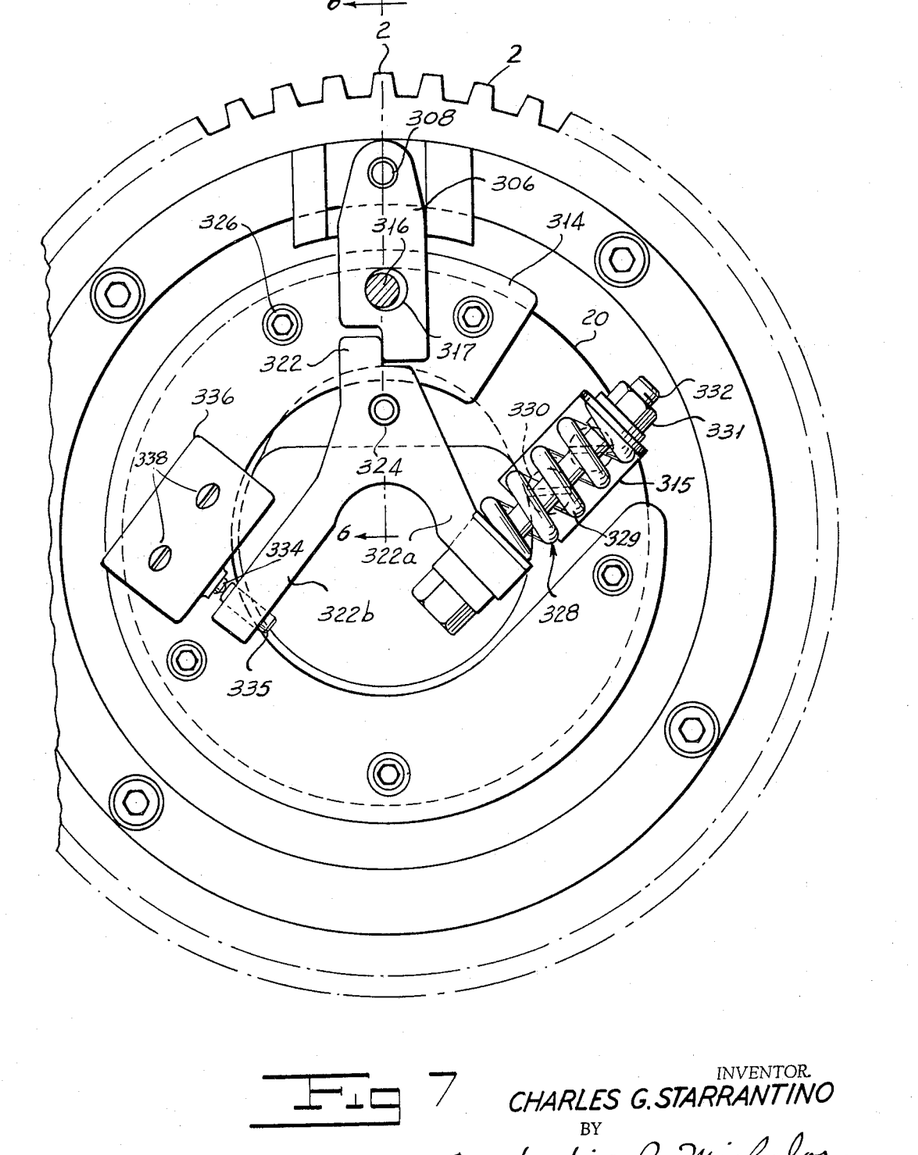
FIGURE 7 is an end view of the modified automatic lever disconnect device of FIGURE 6; and, FIGURE 8 is an isometric diagrammatic view showing generally the components included in the aircraft control system to which the clutch mechanism of FIGURE 1 may be applied.

In reference to FIGURE 7, the mounting plate 314 is shown mounted to the input shaft 20 by bolts 326, and connected to the lever 306 by the pin 316 floating in the oversize hole 317.

One leg 322a of the lever 322 is mounted to a pre-loaded compression spring 328. The spring 328 is mounted on the mounting frame 314 through a bracket 315 by screws 330. The load on the spring 328 is adjusted by adjusting a nut 331 in threaded engagement with a bolt 332, with the bolt 332 being in threaded engagement with the leg 322a of the lever 322. The bolt 332 is arranged relative to the spring 328 so that the bolt 332 extends axially through coils 329 of the spring 328.

Another leg 322b of the lever 322 is in threaded engagement with a set screw 335. The set screw 335 is in contacting relation with an actuator 334 of a switch 336' secured to the mounting frame 314 by screws 338.

The set screw 335 is adjusted so that as the sprocket 2 and the input shaft 20 rotate, the actuator 334 of the switch 336 will be retained in the "on" position. In the four lever control system being described herein, the manual restraining of any three levers will lock the input shaft 20 causing it to stop rotating while the sprocket 2 continues to be driven by the servo motor 3. The lever 306, pivotally engaged with the sprocket 2 rotating in a clockwise direction, will impose upon the lever 322, pivotally engaged with the locked input shaft 20, a force causing the lever 322 to pivot in a counter clockwise direction about the pin 324. The set screw 335 will thus move away from the switch actuator 334 causing the switch 336 to open and interrupt the control of the servo motor 3 by the computer 250 in a manner such as that shown in the U.S. Patent No. 3,043,539 hereinabove mentioned.

In reference to FIGURE 7, the lever 322 is prevented from moving until a restraining force is generated sufficient to overcome the pressure of the pre-loaded spring 328. Upon release of this force, the lever 322 will return to its normal position with the set screw 335 engaging the actuator 334 of the switch 336 thus causing the servo motor 3 to be controlled by the computer 250.

*Summary*

In general, the embodiments of the present invention provide for a torque to be transmitted to aircraft controls by a plurality of control levers, with this torque being a function of the axial force imposed upon these levers through friction discs on either side thereof. This axial force is provided by the lateral movement of a solenoid armature having a pressure plate coupled thereto. When the solenoid is energized, the solenoid armature will move toward the solenoid core carrying the attached pressure plate with it. As the pressure plate moves in a lateral direction, it will cause a displacement of the friction discs on either side of the control levers. A friction force will be thus exerted on the control levers, causing these levers to transmit a torque which may be coupled through conventional means to aircraft controls.

The amount of axial force transmitted to the friction discs depends on the air gap between the solenoid armature and the solenoid core, a maximum force being transmitted when the air gap is smallest. The present invention provides for an external adjustment of this air gap, and hence an external adjustment in the torque that may be transmitted by the control levers.

Another embodiment of the present invention provides for a friction lock means whereby the lateral movement caused by the manual rotation of a threaded friction lock lever imposes an axial force on the friction discs. When the solenoid is de-energized, the lateral movement of the friction lock lever also causes the engagement of non-rotating and a rotating face gear, the rotating face gear being coupled to the pressure plate. Since the rotating face gear is rigid due to its engagement with the non-rotating face gear, the amount of friction imposed by the lateral movement of the friction lock lever is thus locked into the system. Upon energizing the solenoid, the gears will dis-engage, and the system will be unlocked, permitting a friction level to be imposed by the solenoid air gap as heretofore noted.

Maximum and minimum control lever positions are determined by cam operated switches. With the maximum and minimum points predetermined, circuitry is provided which will cut off power to the servo when travel of the control levers reaches these predetermined points.

The present invention also embodies a means whereby power will be removed from the driving servo whenever the force exerted to manually override the control levers exceeds a predetermined level. This means provides for a lever actuated switch, the switch being dis-engaged for cutting off power to the servo whenever the force exceeds this level.

The basic clutch mechanism embodied in the present invention, as applied to an automatic aircraft control system, is best shown in FIGURE 8.

In reference, then, to FIGURE 8, a condition sensor 7 provides a command signal to the computer 250 through line conductors 9 and 11. The computer 250, in response to the signal of the condition sensor 7, acts to control the servo motor 3, through the clutch mechanism 1, by the line conductors 249 and 251 and the line conductor 243 coupling the computer 250, the servo motor 3 and the clutch mechanism as shown in FIGURE 5. The servo motor 3 converts the electrical input provided by the computer 250 to a mechanical output sensed at the sprocket 13 of the servo motor 3. This mechanical output may be transmitted to the clutch mechanism 1 by the chain 19 coupling the sprocket 13 of the servo motor 3 to the sprocket 2 of the clutch mechanism.

The clutch mechanism 1 creates a friction force causing the control levers 90 to rotate in response to the rotation of the sprocket 2 in a manner as heretofore described. The rotational motion of the control levers 90 is transmitted to the controls 5 through the linkages 21 connecting the control levers 90 with the controls 5. The controls 5 may be manually operated by the pilot of the aircraft when the automatic control system is disengaged or when it is necessary to override the automatic control system.

The control levers 90 are operatively connected to control barrels 29 so that the control barrels 29 rotate with the controls 5 in response to the motion of the control levers 90 as transmitted by the linkages 21. The control barrels 29 are coupled by belts 33 to pulleys 35, with the pulleys 35 operably connected to a condition control element 37. The condition control element 37 acts to control an aircraft function such as airspeed, or an aircraft surface, in response to the signal supplied by the condition sensor 7.

The novel means embodied in the present invention, shown by the figures and described herein, provides a versatile device by which the mechanical output of a servo can be translated into aircraft controls movement. The described device requires a minimum of manual engagement and dis-engagement, but accommodates emergency situations where manual overriding may be necessary. For these reasons, the present invention provides a useful addition to automatic flight control systems, and should enjoy a wide utilization in this area.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a system to move aircraft controls, a servo motor and a clutch means coupled to said servo motor, said clutch means comprising, mounting frames, an axially extending shaft rotatably mounted to said frames, a hub rigidly mounted to one end of said shaft, a sprocket affixed to said hub, said sprocket, hub and shaft rotating as one relative to said mounting frames, the rotating motion being provided by the servo motor coupled to said sprocket, a plurality of control levers mounted freely on said shaft and spaced along an axis parallel to the axis of said shaft, friction discs supported on either side of each of said control levers, corresponding friction elements bonded to said friction discs, said friction discs secured to said shaft so as to rotate with said shaft but being laterally displaceable relative thereto, a solenoid means having an armature and a core, a pressure plate cooperatively arranged with said shaft so as to rotate with said shaft and said pressure plate cooperatively arranged with the armature of said solenoid means so as to move laterally with the armature toward said core when said solenoid means is energized, a clutch disc secured to said shaft so as to rotate with said shaft and being laterally displaceable relative thereto, said pressure plate being in cooperative arrangement with said friction discs through said clutch disc, spring means interposed between said clutch disc and said pressure plate so that the lateral movement of said pressure plate will cause a lateral force to be transmitted to said clutch disc through said spring means, the lateral force being further transmitted to said friction elements through said friction discs, said friction elements converting the lateral force to a frictional force which is operably exerted on said control levers, the frictional force causing rotational motion of said control levers about an axis parallel to the axis of said shaft in response to the rotational motion of said servo motor, switch means cooperatively arranged with said control levers to restrict the rotation of said control levers within predetermined limits with rotation beyond these limits causing removal of power to said servo motor, a disconnect means responsive to a manual restraint of said control levers so as to remove power to said servo when said restraint exceeds a predetermined level, and connecting means making said aircraft controls responsive to the movement of said control levers.

2. In a system to move aircraft controls, a servo motor and a clutch means coupled to said servo motor, said clutch means comprising, mounting frames, a shaft journaled within said mounting frames, a wheel means affixed to one end of said shaft and coupled to the servo motor, the rotational motion of the servo motor being transmitted to said shaft through said wheel means, a plurality of control levers mounted freely on said shaft and spaced along an axis parallel to the axis thereof, laterally displaceable friction means mounted to said shaft so as to rotate with said shaft, each of said control levers interposed between said friction means, means to create a variable lateral force, means responsive to said variable lateral force to cause lateral displacement of said friction means, said displacement causing a frictional force to be exerted on said control levers with the frictional force causing said control levers to rotate in response to the rotation of said servo motor, and said control levers coupled to said aircraft controls for moving the same.

3. The combination defined by claim 2 in which said means to create a variable lateral force comprises a pressure plate, a solenoid operably connected to said pressure plate, said solenoid including a core in cooperative arrangement with an armature, a shaft operably mounted to the armature of said solenoid so that the armature and said shaft will rotate as one, the armature and the core of said solenoid operably arranged so as to be separated by an air gap of adjustable width, said pressure plate being in threaded engagement with said armature shaft so that angular adjustment of the armature shaft relative to the pressure plate will adjust the width of said air gap, and the force generated by the movement of the armature toward the core upon energization of said solenoid varying inversely as the width of said air gap.

4. In a system to move aircraft controls, a servo motor and a clutch means coupled to said servo motor, said clutch means comprising a mounting frame, a shaft journaled in said mounting frame, a wheel means affixed to one end of said shaft and coupled to the servo motor, the rotational motion provided by said servo motor being transmitted to said shaft through said wheel means, a plurality of control levers mounted freely on said shaft and spaced along an axis parallel to the axis of said shaft, laterally displaceable frictional means mounted to said shaft so as to rotate with said shaft, each of said control levers interposed between said friction means, a solenoid means having an armature and a core, a pressure plate cooperatively arranged with said shaft so as to rotate with said shaft and cooperatively arranged with the armature of said solenoid so as to move laterally with the armature toward the core when said solenoid is energized, means for converting the lateral movement to a frictional force causing rotation of said control levers, and means for manually inserting and locking a level of friction into said system when said solenoid is de-energized.

5. The combination defined by claim 4 in which said means for manually inserting and locking a level of friction into said system when said solenoid is de-energized includes a friction lock lever in threaded engagement with said frame, a clutch plate, means to couple said clutch plate to said friction lock lever, a face gear rigidly mounted to said clutch plate, another opposed face gear mounted to said pressure plate so as to rotate with said pressure plate, the manual rotation of said friction lock lever relative to said frame causing lateral movement of said friction lock lever and said clutch plate coupled to said friction lock lever, means to convert said lateral movement to a frictional force imposed on said control levers, the lateral movement of said friction lock lever also causing said face gear rigidly mounted to said clutch plate to engage said face gear rotating with said pressure plate, the rotation of said last-named face gear being prevented by the engagement, said system being thus locked with the frictional force imposed on said control levers, and said system being unlocked by the energization of said solenoid causing the lateral movement of said pressure plate and the dis-engagement of said face gears.

6. The combination defined by claim 4 in which said means for manually inserting and locking a level of friction into said system when said solenoid is de-energized includes a laterally movable means, means to provide lateral movement thereto, means to convert the lateral movement into a friction force, means to impose the friction force on said control levers, means coupled to said rotating pressure plate, means coupled to said laterally movable means which, when engaged with said means coupled to said rotating pressure plate, will prevent the rotation of said pressure plate and said shaft and lock said system, and means to dis-engage said means coupled to said laterally movable means, and means coupled to said pressure plate so as to enable said pressure plate and said shaft to rotate, thus unlocking said system.

7. In a system to move aircraft controls, a servo motor and a clutch means coupled to said servo motor, said clutch means including, a mounting frame, a shaft journaled in said mounting frame, a means responsive to rotational motion provided by said servo motor and coupled to said shaft to transmit the rotational motion to said shaft a plurality of control levers mounted freely on said shaft and spaced along an axis parallel to the axis of said shaft, laterally displaceable friction means mounted to said shaft so as to rotate with said shaft, each of said control levers interposed between said friction means, means cooperatively arranged with said friction means to cause lateral displacement of said friction means, the lateral displacement causing a frictional force to be imposed upon said control levers, the frictional force causing rotation of said control levers in response to said rotation of said servo motor, and said control levers operably coupled to the controls of the aircraft for moving the same.

8. In a system to move an aircraft control, a servo motor and a clutch means coupled to said servo motor, said clutch means including a mounting frame, a shaft journaled in said mounting frame, a means responsive to rotational motion provided by said servo motor and coupled to said shaft to transmit the rotational motion to said shaft, friction means, at least one control lever freely mounted on said shaft and interposed between said friction means, said friction means being mounted to said shaft so as to rotate with said shaft, but laterally displaceable relative thereto, means cooperatively arranged with said friction means to displace at least one of said frictional means, the lateral dsiplacement causing a frictional force to be imposed upon said control lever, said frictional force causing rotation of said control lever in response to the rotation of the servo motor, said control lever being coupled to said aircraft controls for moving the same.

9. In a system to move aircraft controls, a condition sensor, a servo motor controlled by said condition sensor, a clutch means coupled to said servo motor, said clutch means including a mounting frame, a shaft journaled in said mounting frame, a means responsive to the rotation of said servo motor and coupled to said shaft to transmit the rotational motion to said shaft, friction means, a plurality of control levers freely mounted on said shaft and interposed between said friction means, said levers mounted to said shaft so as to rotate with said shaft but laterally displaceable relative thereto, means cooperatively arranged with said friction means to cause lateral displacement of said frictional means, a frictional force being created by the lateral displacement of said friction means, said friction force causing said control levers to rotate about an axis parallel to the axis of said shaft in response to the rotation of said servo motor, and means to restrict the rotation of said control levers within predetermined upper and lower limits, with rotation beyond said predetermined limits causing removal of said power input to said servo motor.

10. The combination defined by claim 9 in which said means to restrict the rotation of said control levers includes control lever barrels integral to said levers, said control levers fitting freely over said shaft and having said barrels extending circumferentially around said shaft, a plurality of lower control limit cam actuated switches corresponding to the control levers, a plurality of upper control limit cam actuated switches corresponding to every other throttle control lever, cam means responsive to said upper and lower control limits, means to cooperatively arrange said upper and lower control limit switches with said cam means responsive to the upper and lower control limits, and circuit means coupled to said upper and lower switches wherein said circuit means causes removal of power to said servo motor when the upper or lower control limits are exceeded, causing said cam means responsive to said upper and lower control limits to activate said switches.

11. The combination defined by claim 10 in which said cam means responsive to the upper and lower control limits comprises cams mounted on said barrels of said throttle control levers, said cams being contoured with relation to the predetermined position of the upper and lower control limits so that said cams will displace said actuators of said switches when said control limits are reached, and said displacement causing said circuit means to open to effect the removal of power to said servo motor.

12. The combination defined by claim 10 in which means to cooperatively arrange the upper and lower control limit switches with said cam means responsive to said upper and lower control limits comprises, a lower control switch holding bracket and an upper control switch holding bracket, said holding brackets being adjustably mounted on either side of said shaft, one holding bracket on one side and the other holding bracket on the other side thereof and on an axis parallel to the axis of said shaft, means to mount said switches on said switch holding brackets so that said switches are in contact with said cams, means to adjust said brackets holding said switces so that said switches will be displaced to open said switches when said switches are in contact with said respective control points on said cams, and means to secure said switch holding brackets in said adjusted position.

13. The combination defined by claim 10 in which said circuit means coupled to said upper and lower swicthes includes a lower control switch circuit having said lower control switches connected in parallel relation to each other, an upper control switch circuit having said upper and lower switch circuits coupled in parallel to a common input power supply, a first electronic control means, the output of said lower control switch circuit coupled to said servo motor through said first electronic control means, said first electronic control means opening a switch disconnecting said servo when a preselected number of lower control limit switches are actuated, and a second electronic control means, the output of said upper control switch circuit coupled to said servo motor through said second electronic control means, said second electronic control means opening another switch disconnecting said servo when a preselected number of upper control limit switches are actuated.

14. In a system to move aircraft controls, the combination comprising a power source, a rotatably mounted wheel coupled to said power source so as to respond to the rotating motion provided by said power source, a rotatably mounted shaft cooperatively arranged with said wheel so as to rotate with said wheel, a plurality of control levers mounted on said shaft, means to exert a friction force on said levers causing said levers to rotate in response to the rotation of said shaft, lever means in cooperative arrangement with said wheel and said shaft, said lever means responsive to a displacement of said shaft relative to said wheel caused by manually restraining the motion of said control levers, and switch means to disconnect said rotating source when said restraining force imposed on said control levers reaches a predetermined limit.

15. A system for actuating aircraft controls comprising a plurality of control levers for actuating the aircraft controls, a servo motor, clutch means for drivingly connecting the servo motor to the control levers for actuating the aircraft controls, automatic means for operating the clutch means, manual means for operating said clutch means operable upon disengagement of the automatic means, means for rendering the servo motor inoperative to drive the control levers when said control levers are driven to their limits, and means for rendering said servo motor inoperative to drive the control levers when said control levers are restrained from being driven.

16. A system for actuating aircraft controls comprising a rotatable shaft, a servo motor drivingly connected to the shaft, a plurality of control levers for actuating the aircraft controls rotatably mounted on said shaft, laterally displaceable friction means rotatable with said shaft and interposed between the control levers, means for laterally displacing the friction means to exert a friction force on the control levers causing said control levers to rotate about the axis of the shaft in response to the rotation of the servo motor, and means for rendering the servo motor inoperative to operate the control levers when said control levers move to their limits.

17. A system for actuating aircraft controls comprising a rotatable shaft, a servo motor drivingly connected to the shaft, a plurality of control levers for actuating the aircraft controls rotatably mounted on said shaft, laterally displaceable friction means rotatable with said shaft and interposed between the control levers, means for laterally displacing the friction means to exert a friction force on the control levers to drivingly connect said control levers to the servo motor for actuating the aircraft controls, means for rendering said servo motor inoperative to drive the control levers when said control levers are driven to their limits, and means for rendering said servo motor inoperative to drive the control levers when said control levers are restrained from rotating about the shaft.

18. A system for actuating aircraft controls comprising a power source, a shaft rotatably connected to the power source, a plurality of control levers rotatably mounted to the shaft, displaceable friction means rotatable with said shaft and interposed between the control levers, means to displace the friction means to exert a friction force on the control levers to drivingly connect said control levers to the power source, means to limit the rotation of said control levers, and means to connect said control levers to the aircraft controls.

19. A system for actuating aircraft controls comprising a rotatable shaft, a servo motor drivingly connected to the shaft, a plurality of control levers for actuating the aircraft controls rotatably mounted on said shaft, laterally displaceable friction means rotatable with said shaft and interposed between the control levers, automatic means for laterally displacing said friction means, manual means for laterally displacing said friction means operable upon disengagement of said automatic means, displacement of said friction means causing a friction force to be exerted on the control levers to drivingly connect said control levers to the servo motor for actuating the aircraft controls, means for rendering said servo motor inoperative to drive the control levers when said control levers are driven to their limits, and means for rendering said servo motor inoperative to drive the control levers when said control levers are restrained from rotating about the shaft.

References Cited by the Examiner

UNITED STATES PATENTS 3,105,577   10/1963   Iding ______________ 192—.02

DAVID J. WILLIAMOWSKY, *Primary Examiner.*

A. T. McKEON, *Assistant Examiner.*